United States Patent
Layton et al.

(10) Patent No.: US 8,138,622 B2
(45) Date of Patent: Mar. 20, 2012

(54) SYSTEM AND METHOD FOR AN AC POWERED DOWNHOLE GAUGE WITH CAPACITIVE COUPLING

(75) Inventors: James E. Layton, Chelsea, OK (US); Dick L. Knox, Claremore, OK (US); Gordon L. Besser, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 353 days.

(21) Appl. No.: 11/779,768

(22) Filed: Jul. 18, 2007

(65) Prior Publication Data

US 2009/0021393 A1    Jan. 22, 2009

(51) Int. Cl.
*H02J 3/02* (2006.01)
*H02J 3/34* (2006.01)

(52) U.S. Cl. ............. 307/3; 307/30; 340/855.7; 361/85; 324/519

(58) Field of Classification Search ....................... 307/30
See application file for complete search history.

(56) References Cited

U.S. PATENT DOCUMENTS

| | | | | |
|---|---|---|---|---|
| 3,943,435 A * | 3/1976 | DeJarnette | ..................... | 323/359 |
| 3,950,676 A * | 4/1976 | Dornseifer et al. | ............. | 361/40 |
| 4,169,259 A * | 9/1979 | Hidler et al. | ............... | 340/13.23 |
| 4,383,243 A * | 5/1983 | Krugel et al. | ..................... | 307/3 |
| 4,499,452 A * | 2/1985 | Nicolas | ............................. | 307/3 |
| 4,620,189 A * | 10/1986 | Farque | ...................... | 340/855.3 |
| 4,631,536 A | 12/1986 | Ward | | |
| 4,745,391 A * | 5/1988 | Gajjar | ........................... | 307/104 |
| 5,515,038 A | 5/1996 | Smith | | |
| 5,539,375 A * | 7/1996 | Atherton | .................. | 340/538.11 |
| 5,900,179 A * | 5/1999 | Bilenko et al. | ................ | 219/508 |
| 6,070,608 A * | 6/2000 | Pringle | ......................... | 137/155 |
| 6,167,965 B1 | 1/2001 | Bearden | | |
| 6,396,415 B1 * | 5/2002 | Bulmer | ...................... | 340/855.8 |
| 6,587,037 B1 * | 7/2003 | Besser et al. | ............... | 340/854.9 |
| 6,798,338 B1 * | 9/2004 | Layton | ....................... | 340/854.6 |
| 6,839,597 B2 * | 1/2005 | Hattori et al. | ................... | 700/27 |
| 7,248,178 B2 | 7/2007 | Layton | | |
| 2003/0117025 A1 * | 6/2003 | Rouquette | ..................... | 307/147 |
| 2005/0110655 A1 * | 5/2005 | Layton | ...................... | 340/854.9 |
| 2006/0085099 A1 * | 4/2006 | Burlak et al. | ...................... | 701/1 |

FOREIGN PATENT DOCUMENTS

WO    WO2004038950 A2    5/2004

OTHER PUBLICATIONS

Search Report for related application PCT/US2008/069968, dated Jan. 7, 2009.

* cited by examiner

*Primary Examiner* — Jared Fureman
*Assistant Examiner* — Justen Fauth
(74) *Attorney, Agent, or Firm* — Bracewell & Giuliani LLP

(57) ABSTRACT

Borehole instruments are powered by AC instrument power transmitted on all three phases of a power cable concurrently carrying three phase motor power, the instrument power transmitted at a multiple of the motor power frequency and having a corresponding fraction of the motor power voltage, and received via a capacitive coupling sufficient to withstand high-voltage cable insulation testing. The phase-to-neutral motor power provides approximately the same power level to the borehole instruments if a phase shorts to ground.

7 Claims, 1 Drawing Sheet

SYSTEM AND METHOD FOR AN AC POWERED DOWNHOLE GAUGE WITH CAPACITIVE COUPLING

BACKGROUND

1. Field of Invention

The present invention is directed, in general, to borehole production power systems and, more specifically, to powering downhole measurement and control mechanisms using alternating current power over the three phase power cable.

2. Description of Prior Art

Downhole electrical submersible pump (ESP) instrumentation systems are typically powered by impressing a direct current (DC) voltage relative to ground on all three phases of the three phase power cable carrying power to the pump motor. As a result, the normally floating phases of the three phase power system no longer float but are instead maintained at this voltage (on average).

The impressed DC voltage is used to power measurement devices within the borehole and, in most cases, to transmit data back to the surface. However, these direct current systems limit high voltage insulation testing of the three phase cable, and become inoperable if any phase of the three phase power system shorts to ground.

There is, therefore, a need in the art for an improved system for powering downhole instrumentation over a three phase power cable carrying power to a pump motor.

SUMMARY OF INVENTION

To address the above-discussed deficiencies of the prior art the present invention provides for use in a borehole production system, AC instrument power for borehole instruments that is transmitted on all three phases of a power cable concurrently carrying three phase motor power, the instrument power transmitted at a multiple of the motor power frequency and having a corresponding fraction of the motor power voltage. The instrument power is received via a capacitive coupling sufficient to withstand high-voltage cable insulation testing. The phase-to-neutral motor power provides approximately the same power level to the borehole instruments if a phase shorts to ground.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

Figure 1:
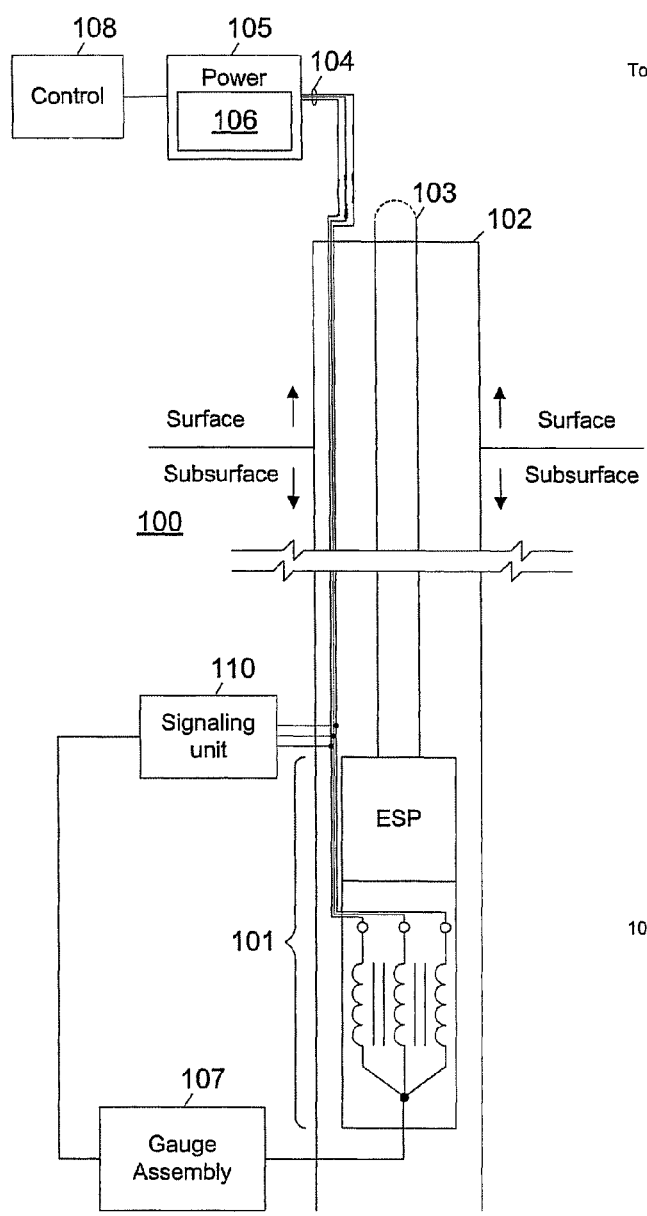
FIG. 1 depicts a borehole production system including a borehole measurement/control device and pump motor power system according to one embodiment of the present invention.

FIG. 1 depicts a borehole production system including a borehole measurement/control device and pump motor power system according to one embodiment of the present invention. Borehole production system 100 in the exemplary embodiment includes an electrical submersible pump and motor subassembly 101 lowered within a borehole 102 by means of production tubing 103.

The motor portion of pump and motor subassembly 101 is powered by three phase power transmitted from the surface over a three phase cable 104. A power source 105 provides the three phase power transmitted to the motor. Those skilled in the art will recognize that power source 105 may comprise a variety of components, such as, for example, a generator or connection to a power distribution grid, a converter and/or inverter, and/or a variable frequency drive (VFD) or variable speed drive (VSD).

Power source 105 in the present invention also includes a subassembly 106 for generating single phase alternating current (AC) power to be transmitted over three phase cable 104 for use in powering measurement and/or control devices within a gauge subassembly 107 located within the borehole 102. The single phase power for the measurement and/or control devices differs in frequency and peak amplitude from the three phase power for the pump motor, as described in further detail below.

Borehole production system 100 includes at least one gauge subassembly 107 disposed within the borehole. Gauge subassembly 107, described in further detail below, measures such characteristics as temperature, pressure, cut, flow rate, or other parameters of the fluid being pumped. Alternatively, gauge subassembly 107 may measure intake pressure, temperature or flow rate, outlet pressure, temperature or flow rate, revolutions per minute, or other operating parameters of the motor/pump subassembly 101. In still further embodiments, gauge subassembly 107 may include, with or without any measurement devices, control mechanisms for opening or closing valves or for operating other electrical or mechanical devices.

While only one gauge subassembly 107 is depicted in FIG. 1, those skilled in the art will recognize that any number of such subassemblies may be employed, and at various locations along the borehole 102 such as below the motor, between the motor and pump, above the pump and/or at the seal, proximate to a packer, at the wellhead (for a subsea well), etc.

In the exemplary embodiment, gauge subassembly 107 is connected to the neutral point termination of a Y-connected three phase motor within the motor/pump subassembly 101. Alternatively, however, the gauge subassembly (or each gauge subassembly, in the case of a borehole production system including multiple such subassemblies) may be connected to one or more conductors within three phase power cable 104, at any location along borehole 102.

Figure 2:
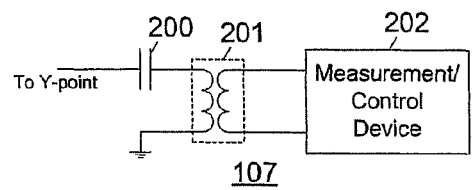
FIG. 2 depicts in greater detail the gauge subassembly for use within a borehole production system according to one embodiment of the present invention.

FIG. 2 depicts in greater detail the gauge subassembly for use within a borehole production system according to one embodiment of the present invention. Gauge subassembly 107 includes a capacitor 200 connected to the motor neutral point or to another appropriately formed Y-point (formed from inductors, capacitors or both) coupled to the three phase power cable 104. Capacitor 200 is appropriately sized to transfer instrument power from the three phase power cable 104, and is rated at a sufficiently high voltage, to allow high voltage testing (megging) of the insulation for the three phase power cable 104 and other downhole equipment.

Capacitor 200 is coupled by a transformer 201 to a measurement and/or control device 202. The power passed through capacitor 200 and transformer 201 is employed to drive electrical components within the measurement and/or control device 202.

Figure 3:
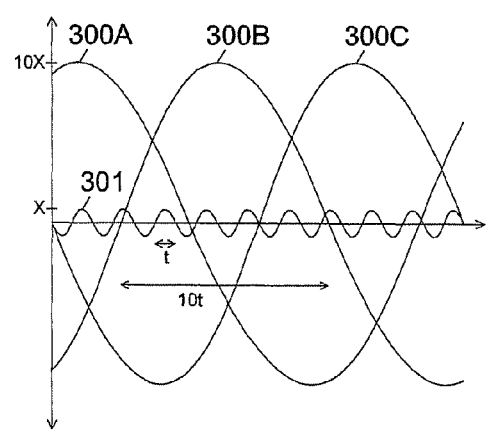
FIG. 3 graphically illustrates the relationship between instrument and motor power on a three phase cable within a borehole production system according to one embodiment of the present invention.

FIG. 3 graphically illustrates the relationship between instrument and motor power on a three phase cable within a borehole production system according to one embodiment of the present invention. The signals depicted illustrate power impressed on the three phase power cable 104. In an exemplary embodiment, the individual conductors of three phase power cable 104 are each driven by one phase A, B or C of the three phase power signal 300 (collectively signals 300A, 300B and 300C). All three phases are also driven by an AC voltage 301 with respect to ground, which is employed as the instrument power for measurement/control device(s) 202 within gauge subassembly 107. Although shown without any direct current offset in the exemplary embodiment, the power on the three phase power cable 104 may also have a ground-referenced direct current component, in which case the instrumentation voltage 301 would be offset from neutral.

The instrument power 301 is set at a voltage that is on the order of one-tenth (a factor of 10 less than) the voltage of the motor power 300 transmitted on the three phase power cable 104, and with a frequency that is on the order of ten times higher than the frequency of the motor power 300 (illustrated in FIG. 3 by the period of the half cycles for the respective signals 300 and 301). For example, instrument power 301 may be approximately 80-100 volts (V) transmitted at 600 Hertz (Hz) while motor power is 1,000 to 2,500 V (peak, up to 4,160 volts phase-to-phase) transmitted at 60 Hz.

As described above, the gauge subassembly is preferably connected to a Y-point coupled to three phase power cable 104. At such a Y-point in a balanced system (with no phase shorted to ground), only the AC instrument power 301 appears at the Y-point, together with any DC offset. When a phase shorts to ground, however, the cumulative downhole motor phase-to-neutral power for the remaining two phases (or single phase, if two phases short to ground) appears at the Y-point. In such an event, the downhole instrumentation 202 is able to use the motor power voltage for power in lieu of the normal instrument power 301. The higher voltage but reduced frequency of the downhole motor power couples into the instrumentation 202 at relatively the same power level, since the impedance of capacitive coupling 200 is inversely proportional to frequency and the frequencies and voltages of motor power 300 and instrument power 301 were selected to be inversely related as described above. Such a system may also be used where the voltage of motor power 300 is much lower or higher than the exemplary numbers listed above by simply adjusting the frequency and voltage of the instrument power 301 with which gauge 107 is designed to operate.

In one embodiment of the present invention, the inductance of transformer 201 may be selected to resonate with the capacitor 200 at the frequency of the instrument power 301, providing a low impedance path for the instrument power and a higher impedance path for the motor power (when a phase is grounded and the motor power appears at the Y-point).

The above-described embodiments disregard data transfer over three phase power cable 104. However, one or more signaling units 110 may be separately coupled to power cable 104 in accordance with the known art to provide modulation of a DC bias or offset on power cable 104 or by superimposition of a radio frequency (RF) signal in accordance with the known art. Such signaling unit(s) 110 may be communicably coupled to gauge assembly 107 separately from the common connection to power cable 104, providing instrumentation 202 with alternate paths for receiving power and signaling.

An alternative embodiment of the present invention when the AC power system is floating involves the transfer of data from the surface downhole, from the borehole to the surface, or both by modulation of the AC current demand by a controller (not shown) in the downhole instrumentation 202. The downhole information may thereby be transmitted to the surface as a linear load change proportional to the AC signal, or as discrete levels transferring encoded data. When encoded data is transferred, the AC coupling system allows a much higher data rate than DC powered data signaling systems since the coupling filter time constants are much shorter. Using two or more discrete levels will further enhance the data rate since each data sample will be shorter. Data may be transferred from a controller 108 at the surface to downhole instrumentation 202 (concurrently with, i.e. bi-directionally, or during separate time periods for data transfer from the borehole to the surface) by shifting the frequency of instrument power 301 by a predetermined deviation, or by briefly interrupting the power signal 301. These techniques allow data to be transferred using the AC instrument power signal 301 as long as the power system is floating.

The present invention provides power from the surface to downhole instrumentation within a borehole over a three phase power cable, either separately from or concurrently with the three phase power for a downhole motor, in a manner tolerating shorting of a conductor within the three phase power cable to ground and/or high voltage insulation testing.

It is important to note that while embodiments of the present invention have been described in the context of a fully functional system and method embodying the invention, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and/or instructions related to the system and the method steps described above.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

What is claimed is:

1. A method of powering a motor and an instrument of a submersible pump assembly, comprising:
    (a) providing a three conductor power cable from a surface location to the motor, which has a Y-point on a lower end of the motor;
    (b) electrically coupling a capacitor to the Y-point and a side of the capacitor opposite the Y-point to the instrument;
    (c) producing three phase motor power for the motor and simultaneously producing single phase instrument power on the three conductor power cable, the instrument power being at a higher frequency and lower voltage than the motor power, the instrument power voltage existing at the Y-point and passing through the capacitor to the instrument, the motor power having a motor voltage that is zero at the Y-point;
    (d) in the event one of the conductors of the power cable shorts to ground, which causes the motor voltage to occur at the Y-point, an impedance of the capacitor increases due to the lower frequency of the motor power than the instrument power, thereby passing to the instrument a reduced level of motor voltage; and
    (e) bi-directionally transmitting data on the three conductor power cable between the surface location and the instrument by modulating the instrument power, interrupting a frequency of the instrument power, or shifting a frequency of the instrument power.

2. The method according to claim 1, further comprising prior to step (c), applying between ground and each conductor of the three conductor power cable a DC test voltage, which is blocked from the instrument by the capacitor.

3. The method according to claim 1, wherein step (b) further comprises:
    coupling the instrument to the capacitor via a transformer, the transformer and the capacitor being selected to provide a low impedance path for the instrument power and a high impedance path for the motor power.

4. The method according to claim 1, wherein the instrument comprises:
    at least one gauge subassembly for measuring an operating characteristic or controlling a device; and step (c) further comprises:
    communicatively coupling a signaling unit to the at least one gauge subassembly for transmitting data on the three conductor power cable.

5. The method of claim 1, wherein step (c) comprises:
    providing the instrument power with a voltage that is approximately a fraction 1/N of the motor power voltage and a frequency that is approximately a multiple N of the motor power frequency.

6. An electrical submersible pump system comprising:
    a three conductor power cable extending from a surface location into a conduit;
    an electrical submersible pump motor within the conduit and coupled to the three conductor power cable, the motor having windings at a lower end joined to form a Y-point;
    a capacitor and transformer coupled to the Y-point;
    an instrument coupled to the transformer, which is connected through the capacitor to the Y-point;
    a power source at the surface coupled to the three conductor power cable, the power source producing three phase motor power to operate the motor and producing single phase instrument power for simultaneous transmission on the conductors of power cable, wherein the instrument power has a voltage that is approximately a fraction 1/N of the motor power voltage and a frequency that is approximately a multiple N of the motor power frequency;
    a controller within the instrument modulating AC current drawn by the instrument from the instrument power to transmit data on the three conductor power cable to the surface location; and
    one or more signaling units separately coupled to the three conductor power cable and transmitting data over the three conductor power cable to the instrument either by temporarily shifting a frequency of the instrument power or by temporarily interrupting tin the instrument power; and
    the capacitor being sized so that when the Y-point has a neutral motor power voltage and the instrument power is transmitted over the three conductor cable, the capacitor passes the instrument power at the instrument power frequency to operate the instrument, and so that when a conductor of the three conductor power cable shorts to ground, creating motor power voltage at the Y-point, the impedance of the capacitor increases to pass a fraction of the motor power voltage at the motor power frequency to operate the instrument.

7. The system according to claim 6, wherein the capacitor blocks from the instrument high DC test voltage during testing of the three conductor power cable insulation.

* * * * *